US012090397B2

(12) United States Patent
Thacker et al.

(10) Patent No.: US 12,090,397 B2
(45) Date of Patent: *Sep. 17, 2024

(54) SYSTEMS AND METHODS FOR USING NATURAL LANGUAGE PROCESSING (NLP) TO CONTROL AUTOMATED EXECUTION OF IN-GAME ACTIVITIES

(71) Applicant: Mythical, Inc., Sherman Oaks, CA (US)

(72) Inventors: Cameron Thacker, Sherman Oaks, CA (US); John Linden, Sherman Oaks, CA (US)

(73) Assignee: Mythical, Inc., Sherman Oaks, CA (US)

( * ) Notice: Subject to any disclaimer, the term of this patent is extended or adjusted under 35 U.S.C. 154(b) by 257 days.

This patent is subject to a terminal disclaimer.

(21) Appl. No.: 17/315,817

(22) Filed: May 10, 2021

(65) Prior Publication Data

US 2022/0111292 A1 Apr. 14, 2022

Related U.S. Application Data

(63) Continuation of application No. 16/949,016, filed on Oct. 9, 2020, now Pat. No. 11,077,367.

(51) Int. Cl.
*A63F 13/42* (2014.01)
*A63F 13/215* (2014.01)
(Continued)

(52) U.S. Cl.
CPC ............ *A63F 13/42* (2014.09); *A63F 13/215* (2014.09); *G06F 40/289* (2020.01); *G06N 20/00* (2019.01);
(Continued)

(58) Field of Classification Search
CPC .................... A63F 13/42; A63F 13/215; A63F 2300/1081; A63F 2300/6045; G06F 40/289
See application file for complete search history.

(56) References Cited

U.S. PATENT DOCUMENTS 7,627,536 B2 * 12/2009 Kacmarcik ............. G06F 40/56
715/706
9,904,669 B2 * 2/2018 Gunaratna ............ G06F 40/242
(Continued)

OTHER PUBLICATIONS

Ashish Vaswani, et al. : Attention Is All You Need, 31st Conference on Neural Information Processing Systems (NIPS 2017), pp. 1-11.
Kantaro Fukamizu, et al. : Generation High resolution 3D model from natural language by Generative Adversarial Network. Jan. 22, 2019; pp. 1-9.
(Continued)

*Primary Examiner* — James S. McClellan
*Assistant Examiner* — Ross A Williams
(74) *Attorney, Agent, or Firm* — Esplin & Associates, PC (57) ABSTRACT

Systems and methods for using natural language processing (NLP) to control automated gameplay in one or more online games within an online gaming platform are disclosed. Exemplary implementations may: train a pretrained text-based system to generate sequences indicating one or more activities, wherein activities are associated with characteristics of user-controllable characters such that a particular user-controllable character having a particular characteristic may perform, within the online gaming platform, one or more activities from a particular set that is associated with the particular characteristic; receive user input describing one or more commands; generate, using the pretrained text-based system, a sequence indicating one or more activities based on the user input; transfer the generated sequence to the online gaming platform; effectuate automated execution of activities by the particular user-controllable character in accordance with the generated sequence.

20 Claims, 4 Drawing Sheets

(51) Int. Cl.
  *G06F 40/289* (2020.01)
  *G06N 20/00* (2019.01)
(52) U.S. Cl.
  CPC .......... *A63F 2300/1081* (2013.01); *A63F 2300/6045* (2013.01)

(56) References Cited

U.S. PATENT DOCUMENTS

| | | | | |
|---|---|---|---|---|
| 9,908,052 | B2* | 3/2018 | Allen | A63F 13/65 |
| 10,930,066 | B1 | 2/2021 | Thacker | |
| 2007/0015121 | A1 | 1/2007 | Johnson | |
| 2007/0288404 | A1* | 12/2007 | Kacmarcik | G06F 40/56 706/11 |
| 2008/0242425 | A1 | 10/2008 | Isaka | |
| 2011/0320965 | A1* | 12/2011 | Hairman | A63F 13/822 715/757 |
| 2013/0060811 | A1 | 3/2013 | Dircks | |
| 2015/0121216 | A1* | 4/2015 | Brown | G06N 3/008 715/705 |
| 2015/0338917 | A1* | 11/2015 | Steiner | H04L 9/3271 345/156 |
| 2016/0059134 | A1 | 3/2016 | Tait | |
| 2017/0091659 | A1* | 3/2017 | Sanchez | G06N 5/04 |
| 2017/0185915 | A1* | 6/2017 | Chawla | G06Q 30/02 |
| 2018/0357922 | A1* | 12/2018 | Dutta | G06F 16/13 |
| 2019/0046879 | A1* | 2/2019 | Halper | A63F 13/47 |
| 2019/0108215 | A1* | 4/2019 | Jaroch | G06F 40/253 |
| 2019/0311547 | A1 | 10/2019 | Ohmori | |
| 2019/0325028 | A1* | 10/2019 | Palanichamy | G07F 17/3209 |
| 2020/0101383 | A1* | 4/2020 | Hwang | A63F 13/215 |
| 2020/0184668 | A1 | 6/2020 | Rad | |
| 2020/0233400 | A1 | 7/2020 | Wright | |
| 2020/0250540 | A1 | 8/2020 | Mehr | |
| 2020/0269136 | A1* | 8/2020 | Gurumurthy | G06N 3/08 |
| 2021/0287430 | A1 | 9/2021 | Li | |

OTHER PUBLICATIONS

Jiajun Wu, et al. : Learning a Probabilistic Latent Space of Object Shapes via 3D Generative-Adversarial Modeling, 29th Conference on Neural Information Processing Systems (NIPS 2016), pp. 1-11.
Ian J. Goodfellow, et al. : Generative Adversarial Nets, Jun. 10, 2014, 9 pgs.
Kevin Chen, et al. : Text2Shape: Generating Shapes from Natural Language by Learning Joint Embeddings, Mar. 22, 2018; pp. 1-35.
Diederik Kingma, et al. : An Introduction to Variational Autoencoders, Foundations and Trends in Machine Learning, Dec. 11, 2019, 89 pages.
Pierre Baldi : Autoencoders, Unsupervised Learning, and Deep Architectures, JMLR: Workshop and Conference Proceedings 27:37{50, 2012, 37 pages.
Lee Seversky, et al. : Real-time Automatic 3D Scene Generation from Natural Language Voice and Text Descriptions; Department of Computer Science State University of New York at Binghamton; Oct. 23-27, 2006, 4 pgs.
Zhirui Zhang, et al. : Bidirectional Generative Adversarial Networks for Neural Machine Translation, University of Science and Technology of China, Oct. 31-Nov. 1 2018, pp. 189-190.
Pranav Gandgi, et al. : Generating 3D Models Using 3D Generative Adversarial Network, International Research Journal of Engineering and Technology, Apr. 2019, pp. 886-890.
Anonymous authors (paper under review) : Hierarchical Bayes Autoencoders, 2020, pp. 1-11.
Mark Chen, et al. : Generative Pretraining from Pixels, Mar. 22, 2018, pp. 1-35.
Angel Chang, et al. : Text to 3D Scene Generation with Rich Lexical Grounding, Jul. 2015, 15 pgs.
Gizel, Fused voxel autoencoder for single image to 3D object reconstruction, Electronics Letters Feb. 6, 2020 vol. 56 No. 3 pp. 134-137. (Year: 2020).
Vincent, James, "Openai's Latest Breakthrough is Astonishingly Powerful, but Still Fighting Its Flaws The ultimate autocomplete", Jul. 30, 2020, https://www.theverge.com/21346343/gpt-3-explainer-openai-examples-errors-agi-potential ( Year: 2020), 16 pages.
Guzel, Fused voxel autoencoder for single image to 3D object reconstruction, Electronics Letters Feb. 6, 2020 vol. 56 No. 3 pp. 134-137. (Year: 2020).

* cited by examiner

SYSTEMS AND METHODS FOR USING NATURAL LANGUAGE PROCESSING (NLP) TO CONTROL AUTOMATED EXECUTION OF IN-GAME ACTIVITIES

FIELD OF THE DISCLOSURE

The present disclosure relates to systems and methods for using natural language processing (NLP) to control automated gameplay in one or more online games within an online gaming platform.

BACKGROUND

Online games within online gaming platforms using three-dimensional virtual spaces are known. Natural language processing is known. Automated gameplay when users are "away from keyboard" is known.

SUMMARY

One aspect of the present disclosure relates to a system configured to use natural language processing (NLP) to control automated gameplay in one or more online games within an online gaming platform. The system may include electronic storage, one or more hardware processors, and/or other components. The electronic storage may be configured to electronically store information. The information may include sets of activities. Individual ones of the sets may be associated with characteristics of user-controllable characters such that a particular user-controllable character having a particular characteristic may perform, within the online gaming platform, one or more activities from a particular set associated with the particular characteristic. The one or more hardware processors may be configured by machine-readable instructions to train a pretrained text-based system, using prompts, to generate sequences indicating one or more activities from the particular set of activities. Individual ones of the prompts may be based on a combination of a textual description of an individual activity that is included in the particular set of activities and the individual activity. The processors may receive, from a user, a user input. The user input may include a user-provided textual description describing one or more commands. The processors may generate, using the trained pretrained text-based system, a sequence indicating one or more activities. Generation of the generated sequence may be based on the user-provided textual description. The processors may transfer the generated sequence to the online gaming platform. The processors may effectuate automated execution of activities by the particular user-controllable character in accordance with the generated sequence.

Another aspect of the present disclosure relates to a method to use natural language processing (NLP) to control automated gameplay in one or more online games within an online gaming platform. The method may include electronically storing information. The information may include sets of activities, wherein individual ones of the sets are associated with characteristics of user-controllable characters such that a particular user-controllable character having a particular characteristic may perform, within the online gaming platform, one or more activities from a particular set associated with the particular characteristic. The method may include training a pretrained text-based system, using prompts, to generate sequences indicating one or more activities from the particular set of activities. Individual ones of the prompts may be based on a combination of a textual description of an individual activity that is included in the particular set of activities and the individual activity. The method may include receiving, from a user, a user input. The user input may include a user-provided textual description describing one or more commands. The method may include generating, using the trained pretrained text-based system, a sequence indicating one or more activities. Generation of the generated sequence may be based on the user-provided textual description. The method may include transferring the generated sequence to the online gaming platform. The method may include effectuating automated execution of activities by the particular user-controllable character in accordance with the generated sequence.

As used herein, any association (or relation, or reflection, or indication, or correspondency) involving servers, processors, client computing platforms, user interfaces, activities, characters, characteristics, descriptions, sequences, events, neural networks, databases, formats, pretrained text-based systems, instructions, operations, determinations, presentations, and/or another entity or object that interacts with any part of the system and/or plays a part in the operation of the system, may be a one-to-one association, a one-to-many association, a many-to-one association, and/or a many-to-many association or "N"-to-"M" association (note that "N" and "M" may be different numbers greater than 1).

As used herein, the term "obtain" (and derivatives thereof) may include active and/or passive retrieval, determination, derivation, transfer, upload, download, submission, and/or exchange of information, and/or any combination thereof. As used herein, the term "effectuate" (and derivatives thereof) may include active and/or passive causation of any effect, both local and remote. As used herein, the term "determine" (and derivatives thereof) may include measure, calculate, compute, estimate, approximate, generate, and/or otherwise derive, and/or any combination thereof.

These and other features, and characteristics of the present technology, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a", "an", and "the" include plural referents unless the context clearly dictates otherwise.

DETAILED DESCRIPTION

Figure 1:
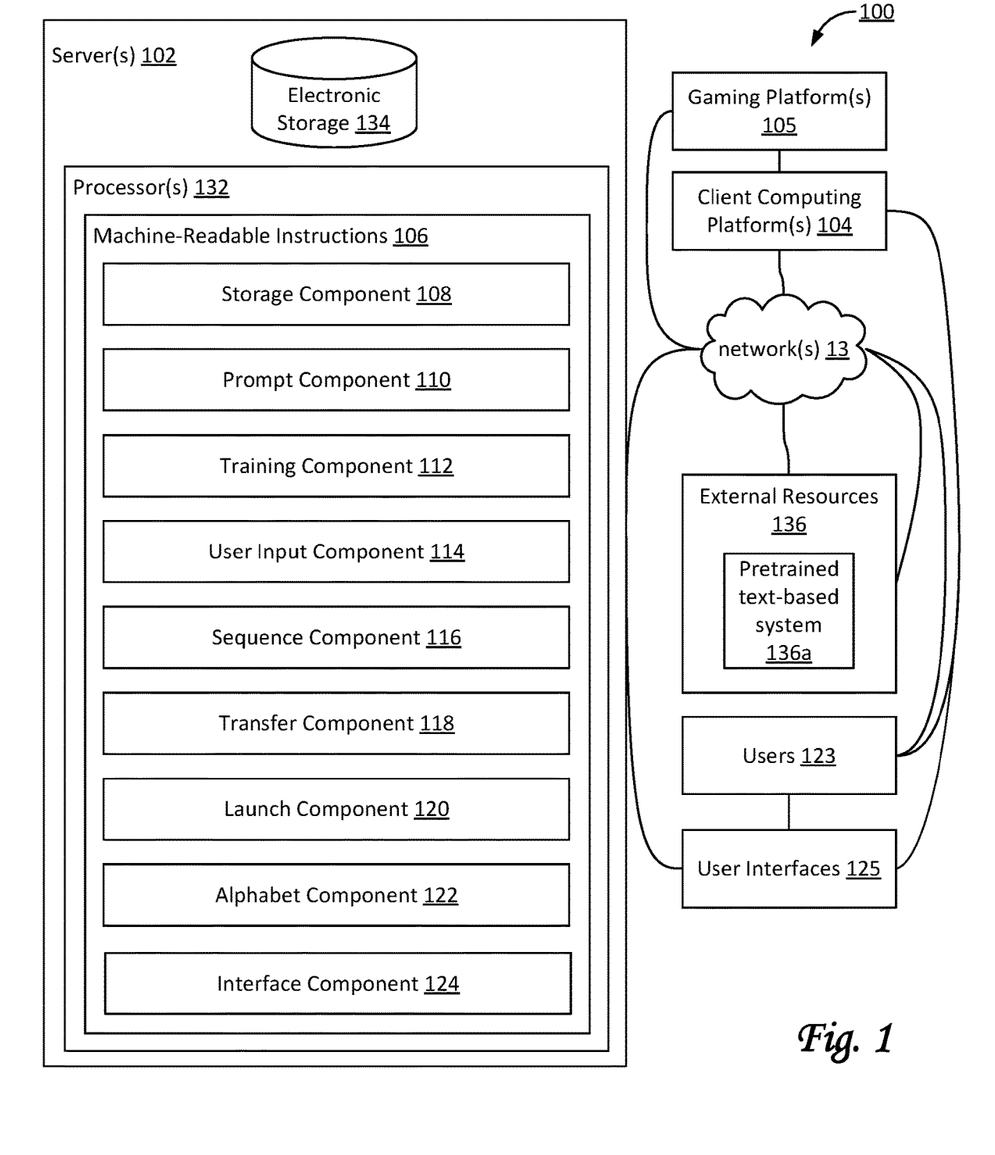
FIG. 1 illustrates a system configured for using natural language processing (NLP) to control automated gameplay in one or more online games within an online gaming platform, in accordance with one or more implementations.

FIG. 1 illustrates a system 100 configured for using natural language processing (NLP) to control automated gameplay in one or more online games within an online gaming platform 105. As used herein, "automated gameplay" may refer to in-game activities occurring as controlled by game logic (e.g., by a game server and/or an online gaming platform, operating independently from the user, at least for a particular duration) such that a user (also referred to as player) is not controlling the in-game activities in real time or near-real-time (though automated gameplay includes activities the user could control). Such in-game actions may be directed by commands (also referred to as instructions) from a user. It may be possible, but not required, that the user is active within the online gaming platform during automated gameplay, e.g., controlling a different user-controllable character in real time. As used herein, the term "automated gameplay" does not refer to the use of an auto battler or auto combat, at least because those types of battle activities are not (and could not be) under real time control by the user. In some implementations, automated gameplay may include the user performing other activities at the same time. For example, a user may control multiple user-controllable characters within an online gaming platform at the same time (or during overlapping windows of time, with the user switching active control between the multiple user-controllable characters). The user may command a first user-controllable character to perform a first activity independently (at least until active real time control by the user is restored), and then the user may switch to actively control a second user-controllable character in real time to perform certain activities, while the first character executes the command (which is a particular sequence of one or more activities that the user could control the first character to perform in real time, but instead control of this gameplay, i.e., this particular sequence, is automated and performed independently).

In some implementations, system 100 may include one or more of electronic storage 134, one or more servers 102, one or more client computing platforms 104, one or more online gaming platforms 105, one or more external resources 136, one or more user interfaces 125, and/or other components. Users 123 (also referred to as players) may include one or more of a first user, a second user, a third user, a fourth user, and/or other users. Users 123 may wish to use natural language to control automated gameplay in one or more online gaming platforms 105. For example, a user may use automated gameplay to control multiple user-controllable characters at the same time. For example, a user could act as a platoon leader and use automated gameplay to control multiple platoon members. For example, a user could (single-handedly) play a Dungeons & Dragons party and use automated gameplay to control multiple members during a campaign.

Server(s) 102 may be configured to communicate with one or more client computing platforms 104 according to a client/server architecture and/or other architectures. Client computing platform(s) 104 may be configured to communicate with other client computing platforms via server(s) 102 and/or according to a peer-to-peer architecture and/or other architectures. Users 123 may access system 100 via client computing platform(s) 104. In some implementations, system 100 and/or server(s) 102 may be configured to communicate with one or more of (online) gaming platform(s) 105, users 123, and/or other components. Users 123 may include players who play and/or otherwise interact on online gaming platform 105. Online gaming platform 105 may host one or more online games.

Server(s) 102 may be configured by machine-readable instructions 106. Machine-readable instructions 106 may include one or more instruction components. The instruction components may include computer program components. The instruction components may include one or more of a storage component 108, a prompt component 110, a training component 112, a user input component 114, a sequence component 116, a transfer component 118, a launch component 120, an alphabet component 122, an interface component 124, and/or other instruction components.

Storage component 108 may be configured to store information electronically, e.g., in electronic storage 134. In some implementations, the stored information may include and/or describe sets of activities. The activities may be performed, scheduled, and/or otherwise automated in one or more games within an online gaming platform, e.g., by user-controllable characters within the online gaming platform. Individual ones of the sets of activities may be associated with individual characteristics of user-controllable characters. For example, a particular user-controllable character may have a particular characteristic, by virtue of which one or more particular activities (or a particular set of activities) could be performed by the particular user-controllable character. For example, a given characteristic could be that the user-controllable character is part of the race of druids or wizards. Accordingly, a given activity could be performing certain feats of magic. As another example, a given characteristic could be that the user-controllable character has (functional) wings. Accordingly, a given activity could be flying. In the same vein, bards may be scheduled to perform different sets of activities than ores, swordsmen, priests, hunters, or diplomats. In some implementations, a characteristic may be related to certain virtual objects. For example, having a short knife may enable automation of different activities than having a longbow. Additionally, losing such a virtual object may remove a particular activity from a set of automatable activities dynamically. In some implementations, a given characteristic may be related to (or may dynamically depend on) a level of experience, a particular skill acquired during gameplay, alliances forged during gameplay, and/or other factors that may be player-specific, character-specific, and/or otherwise dynamic within one or more games. For example, in some implementations, automatable activities may be limited to activities a user-controllable character could perform under (real time or near-real-time) control by the user.

Alphabet component 122 may be configured to determine sets of activities that may be performed by user-controllable characters. In some implementations, alphabet component 122 may be configured to determine sets of activities that may be scheduled and/or otherwise automated for specific user-controllable characters. In some implementations, determined activities may be limited to automatable activities. In other words, some activities that a player can perform interactively with a particular user-controllable character may not be available for automated gameplay (e.g., solving certain types of puzzles, or build complicated designs). In some implementations, determined activities may be limited to game-specific activities, e.g., for a particular game. In other words, a particular limited-edition Blanko™ may be scheduled to perform a first activity but not a second activity in one (mini)game, but the same Blanko™ may be scheduled to perform the second activity and not the first activity in another (mini)game. A set of activities as determined by alphabet component 122 may be referred to as an alphabet (of activities). In some implementations, an alphabet for a basic fighting character may be {fight, retreat, idle}. In some implementations, alphabets may include an activity to notify the player, e.g., that the scheduled activities have concluded, or that the user-controllable character is currently idle, or to report any other pertinent information. For example, the alphabet for a slightly more advanced fighting character may be {fight, retreat, idle, notify player}. Even more advanced fighting characters may have an alphabet like this: {fight using heavy weaponry, snipe, fight using guerilla tactics, ambush, retreat, hold position, safeguard resources, idle, report status, notify player}. In some implementations, alphabets may be user-specific, context-specific, character-specific, and/or otherwise dynamic within one or more games.

Prompt component 110 may be configured to obtain and/or generate examples and/or prompts that may be used to train a pretrained text-based system. In some implementations, for example, prompts may include (and/or be based on) combinations of textual descriptions of individual activities and (indicators of) the individual activities. In some implementations, a set of prompts may be based on a determined set of activities (e.g., determined by alphabet component 122). For example, an individual prompt may include and/or be based on a combination of an activity such as {fight using heavy weaponry} and a textual description such as "attack with all your power". Other example combinations may be {snipe} with "get to a rooftop and pick them off", {ambush} with "hide somewhere and attack by surprise", {retreat} with "clear out if they get close", {hold position} with "don't let them take over your tower", etc. In some implementations, the same activity may be described with multiple textual descriptions. For example, different prompts for the {fight} activity may be based on textual descriptions that include one or more words such as "attack", "kill", "defeat", "battle", "combat", "brawl", "scrap", "duel", etc. For example, different prompts for the {retreat} activity may be based on textual descriptions that include one or more words or phrases such as "evacuate", "flight", "withdraw", "retire", "return", "don't engage", "survive", etc.

In some implementations, examples and/or prompts may describe multiple activities. For example, two or more activities may be grouped together in a sequence, such that a first activity is followed by one or more subsequent activities. For example, a textual description of "Go back to headquarters and let me know when you get there" may describe a first activity (to move or travel within a topography of a virtual space) followed by a second activity (to report or notify the user). In some implementations, a first activity may need to be completed before a second activity may be performed. For example, a textual description of "Gather at least 5 weapons and attack the enemy compound" may describe a first activity that needs to be completed before a second activity may be started. In some implementations, three or more activities may be grouped together in a sequence. For example, a first and a second activity may need to be completed before a third activity may be started. In some implementations, a sequence of activities may include one or more conditional elements. For example, in some implementations, a first activity may be performed until an end-condition has been reached or occurs. In the previous example, the activity of gathering weapons may be performed until a particular quantity of weapons has been gathered. In some implementations, a condition may be used to choose between different activities. For example, a condition may be evaluated, and based on the result either a first or a second activity may be performed subsequently. For example, a textual description of "Defend this base against invaders, but retreat once your team sustains more than 40% casualties" may describe a condition that needs to be evaluated, such as the casualty rate. Responsive to the casualty rate being less than 40%, the defending activity continues, but else, this particular user-controllable character will retreat. In some implementations, a sequence of one or more activities may be repeated (either once, or more than once, or indefinitely).

Figure 3:
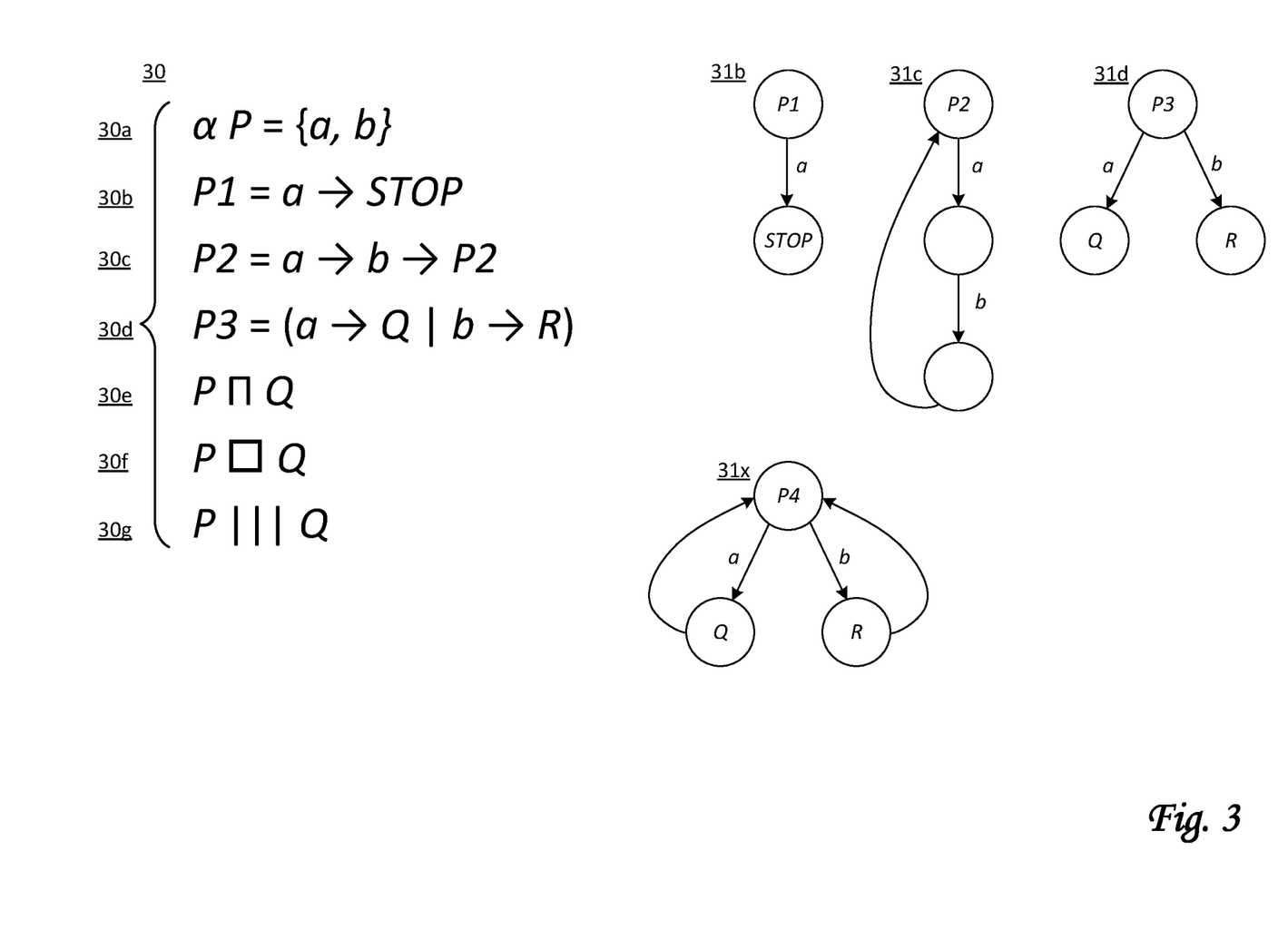
FIG. 3 illustrates exemplary operators and formulae of an exemplary process algebra as may be used to describe (communicating) sequential processes.

In some implementations, a combination of activities may be represented (mathematically) using operators. For example, α may represent the alphabet of a process (here, a sequence of one or more activities). By way of non-limiting example, a process-algebra such as Communicating Sequential Processes (CSP) (by C. A. R. Hoare) may be used to describe sequences ("processes" in CSP) that include one or more activities ("events" in CSP). Assume activities are denoted by lower-case characters or names, such as "a", "b", "c", "fight", "retreat" and processes are denoted by upper-case characters or names, such as "P", "Q", "R", "STOP" etc. The alphabet of "P" may be represented as "αP". For example, "P" may include "a" and "b" as follows: "αP={a, b}". For example, a sequence "P1" that includes activity "a" and then stops may be represented by "P1=a→STOP". For example, a sequence "Px" that includes activity "a" followed by activity "b" and then stops may be represented by "Px=a→b→STOP". For example, a sequence "P2" that includes activity "a" followed by activity "b" and then loops indefinitely may be represented by "P2=a→b→P2". For example, a sequence "P3" that includes a choice of either activity "a" followed by process "Q" or else activity "b" followed by process "R" may be represented by "P3=(a→Q) |(b→R)". Other operators known from CSP may be used as well, including but not limited to one or more of (non-deterministic) "internal choice", (general) "external choice", "interleave", "concurrent/parallel execution", and/or other operators. By way of non-limiting example, FIG. 3 illustrates CSP examples including a set of formulas 30 and graphical representations 31b-31c-31d, and 31x. Set of formulas 30 includes formulas 30a, 30b, 30c, 30d, 30e, 30f, and 30g. Formula 30a denotes the alphabet of process "P" as described above. Formula 30b denotes process "P1" as described above, which is also depicted by graphical representation 31b. Formula 30c denotes process "P2" as described above, which is also depicted by graphical representation 31c. Formula 30d denotes process "P3" as described above, which is also depicted by graphical representation 31d. Formulas 30e, 30f, and 30g illustrate the use of operators for "internal choice", "external choice", and "interleave", respectively. Graphical representation 31x represents a sequence "P4" that includes a choice of either activity "a" followed by process "Q" or else activity "b" followed by process "R", and this entirety looping indefinitely.

Referring to FIG. 1, training component 112 may be configured to train and/or fine-tune a pretrained text-based system (e.g., pretrained text-based system 136a) to generate sequences indicating one or more activities, e.g., from textual descriptions of activities. In some implementations, a generated sequence of activities may be limited to the activities in a particular set of activities (e.g., in an alphabet as determined by alphabet component 122). In some implementations, training component 112 may use examples and/or prompts (e.g., as obtained from prompt component 110) to teach the pretrained text-based system to generate sequences of activities and/or classify activities. In some implementations, a generated sequence may be formatted as a multi-dimensional vector and/or another data-structure, or as a different representation of one or more activities. Once the pretrained text-based system has been trained and/or fine-tuned, a textual description may be used (as input) to produce a sequence of activities. In some implementations, the pretrained text-based system may be Generative Pretrained Transformer 3 (GPT-3), or Generative Pretrained Transformer 2 (GPT-2), or Bidirectional Encoder Representations from Transformers (BERT), and/or another pretrained system. In some implementations, the generation of individual activities (e.g., from a portion of a textual description) may be implemented as a classification (e.g., by a neural network) of which activity in a set of activities appears to be the best match.

Figure 4:
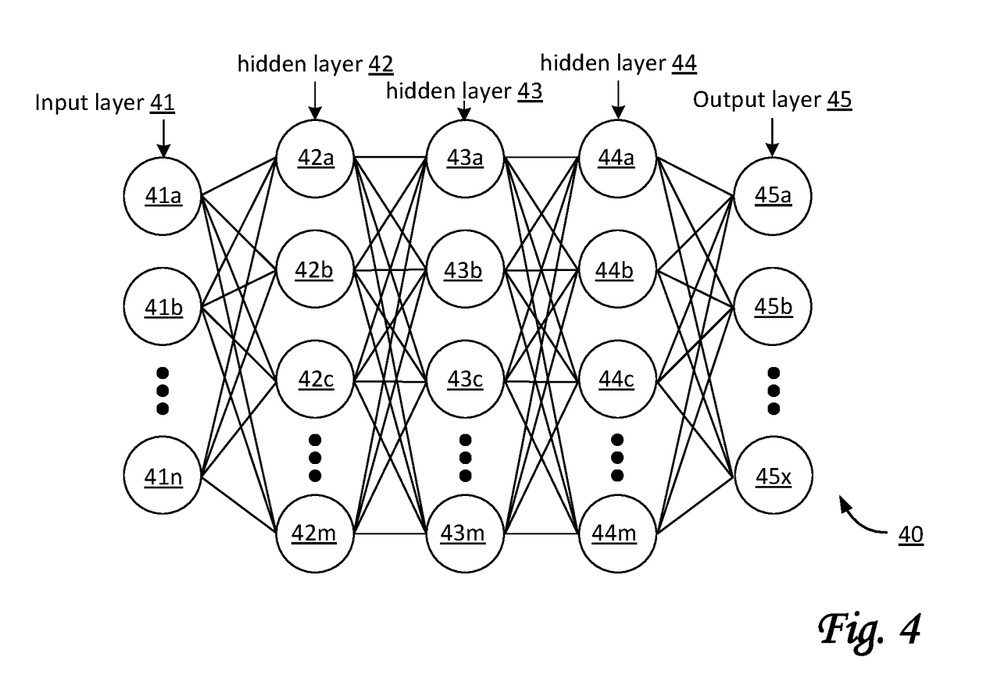
FIG. 4 illustrates a neural network, as may be used by a system configured for using natural language processing (NLP) to control automated gameplay in one or more online games within an online gaming platform.

By way of non-limiting example, FIG. 4 illustrates a neural network 40, including an input layer 41 of nodes, hidden layers 42, 43, and 44, and output layer 45. For example, input nodes 41a, 41b, . . . , 41n may represent n inputs to neural network 40. Each input may represent part of a textual description. The depiction of three hidden layers is merely exemplary, and another numbers of hidden layers are considered within the scope of this disclosure. Hidden nodes 42a, 42b, . . . , 42m may represent m nodes connected to input layer 41. Hidden nodes 43a, 43b, . . . , 43m may represent m nodes connected to hidden layer 42. Hidden nodes 44a, 44b, . . . , 44m may represent m nodes connected to hidden layer 43. The number m may be different for different hidden layers, and typically gets smaller towards output layer 45, where output nodes 45a, 45b, . . . , 45x may represent x output nodes, connected to hidden layer 44. Typically, the number x is much smaller than n or m. Output layer 45 may represent a multidimensional vector of a particular dimensionality (here, a dimensionality of x). Here, neural network 40 is depicted as fully connected, but that is merely an example, and not intended to be limiting. In some implementations, each output node may represent a different activity (e.g., a classification of the nodes of input layer 41 as an activity in an alphabet). In some implementations, output layer 45 may represent a sequence of one or more activities (e.g., based on a representation of the particular way in which multiple activities are grouped together). For example, a particular subset of output nodes may represent one or more operators (including but not limited to CSP-operators as described elsewhere in this disclosure), and one or more other subsets of output nodes may represent activities and/or sequences of activities. In some implementations, a neural network similar to or the same as neural network 40 may be specific to and/or trained for) a particular alphabet of activities. In some implementations, a neural network similar to or the same as neural network 40 may be specific to and/or trained for terms and/or phrases of natural language).

In some implementations, training component 112 may be configured to train and/or fine-tune a pretrained text-based system (e.g., pretrained text-based system 136a) to generate a multi-dimensional vector that represents a sequence indicating one or more activities, e.g., from textual descriptions of activities. In some implementations, an additional (artificial) neural network (e.g., similar to neural network 40 in FIG. 4) may be trained and used to convert and/or transform a multi-dimensional vector (generated by pretrained text-based system 136a) into information that represents a sequence of activities. In some implementations, an additional neural network (e.g., similar to neural network 40 in FIG. 4) may be trained and used to take a multi-dimensional vector (generated by pretrained text-based system 136a) as input and classify this information into one or more activities. In some implementations, other types of machine-learning techniques may be used instead of or in addition to the additional neural network discussed in this paragraph.

Referring to FIG. 1, user input component 114 may be configured to receive user input from users. For example, users may provide user input through user interfaces 125. In some implementations, the user input may include textual descriptions of activities. The user input may describe commands. In some implementations, the user input may be audio captured by a microphone, and this captured audio may be converted (by known techniques) into textual descriptions of activities. The user input may be natural language. The input provided by a user may be natural language. In some implementations, users may indicate and/or select one or more particular user-controllable characters such that the provided user input is associated with and/or otherwise intended for the one or more particular user-controllable characters. For example, a user may select a particular fighter character, and provide the user input "attack with all your power" as a command. In some implementations, such actions may be interpreted as a command for the selected character to perform the activity {fight}, or {fight using heavy weaponry}, as may be appropriate. Other examples of user-provided textual descriptions in natural language may include, by way of non-limiting example, "protect this camp against all enemies," "build a treehouse with two bedrooms," "go gain some experience to level up," "solve the puzzle at the entrance of the cave," "defeat all foes you can find," "explore the map," "buildup your skill-tree," "go make some money," and/or other commands. In some implementations, the same command may be interpreted differently for different user-controllable characters. For example, an assassin might go about making money in a different manner than a dancer or bard, even if their alphabets include similar activities to earn in-game currency.

In some implementations, the one or more games in online gaming platforms 105 may take place in a virtual space and/or otherwise include a virtual space. An instance of a virtual space may include virtual space content associated with individual objects and the arrangement(s) of the objects, and/or other information. In some implementations, the instance of the virtual space may include a simulated space that is accessible by the users. The simulated space may have a topography, express ongoing real-time interaction by one or more users, and/or include one or more objects (e.g., user-controllable characters) positioned within the simulated topography that are capable of locomotion within the simulated topography. The simulated topography may include surface features of a surface or objects that are "native" to the space. In some instances, the simulated topography may describe a surface (e.g., a ground surface) that runs through at least a substantial portion of the space. In some instances, the simulated topography may describe a volume with one or more bodies and/or objects presented therein (e.g., celestial bodies). In some implementations, execution of commands may facilitate locomotion of user-controlled characters within the simulated topography of the virtual space. View information presented to users may include a depiction of the user-controlled characters within the simulated topography of the virtual space.

Sequence component 116 may be configured to generate, using pretrained text-based system 136a, sequences of activities to be performed by selected and user-controllable character (i.e., when not under automated control). In some implementations, generated sequences may be based on user selection and/or user input. In some implementations, sequence component 116 may obtain the user input (e.g., textual descriptions) from user input component 114. A user-provided textual description may serve as an input or prompt to pretrained text-based system 136a, which generates (information representing) a particular sequence of activities that corresponds to the user-provided textual description. As used herein, generation of a sequence of activities may be implemented as generation of a description of a sequence of activities. In some implementations, generation of a sequence of activities may include the generation and usage of an intermediary type of information in the form of a multi-dimensional vector.

In some implementations, users may label and/or otherwise refer to particular (generated) sequences, e.g., by naming a particular sequence. In some implementations, such names may be used to generate more complex sequences that include previously generated sequences. In some implementations, users may label and/or otherwise refer to particular points within a (generated) sequence, e.g., by using indicators. In some implementations, such indicators may be used to generated more complex sequences that transition to the particular points (like a "goto" command"). In some implementations, operation by pretrained text-based system 136a may be based, at least in part, on previously generated and executed sequences.

In some implementations, a particular generated sequence may include a set of activities that game logic can non-deterministically choose from. For example, a particular selected user-controllable character may be tasked with a set of five activities to choose from. In some implementations, a group of user-controllable characters may be tasked with completing a set of activities. The game logic may subsequently determine independently how to allocate tasks to group members. Depending on the group members (and, e.g., their relationships within the group), the group members may compete to complete activities or collaborate to complete activities. In some implementations, particular types of commands may be added to the default behavior of certain user-controllable characters. In some implementations, a particular user-controllable character may be tasked with finding other user-controllable characters and pass along commands to those found characters. For example, the particular user-controllable character may act as a recruiter and/or messenger, such that commands spread across more user-controllable characters as the game progresses. For example, a recruiter character may be tasked with finding other user-controllable characters to collaboratively complete a set of activities. In some implementations, a subsequently recruited user-controllable character may select a particular activity from the recruiter character's set of activities such that the selected particular activity is based on the characteristics of the recruited user-controllable character.

Transfer component 118 may be configured to transfer information to one or more online gaming platforms 105. The transferred information may include (representations of) generated sequences, user-provided selections of user-controllable characters, commands, and/or other information. In some implementations, transfer component 118 may transfer sequences generated by sequence component 116. In some implementations, transfer component 118 may convert sequences into a format suitable for transmission. For example, in some implementations, a combination of (i) a selection of a particular user-controllable character, and (ii) a particular sequence of activities to be performed automatically and independently by the particular user-controllable character may be stored and/or streamed in an electronic file or packet of information, and subsequently retrieved and/or otherwise obtained by one or more online gaming platforms 105. As used herein, transfer of a sequence of activities may be implemented as transfer of a description of a sequence of activities.

Launch component 120 may be configured to effectuate execution of (sequences of) activities by user-controllable characters. Launch component 120 may effectuate automated and independent execution of activities within online gaming platform 105. In some implementations, the activities as executed may be in accordance with a generated sequence of activities. In some implementations, the generated sequence may be generated by sequence component 116 and/or transferred by transfer component 118. In some implementations, game logic (e.g., as included in a game server and/or online gaming platform 105) may operate independently from the user, at least for a particular duration, to control automated gameplay by user-controllable characters according to generated sequences of activities, based on user-provided textual descriptions. For example, a sequence may include an activity such as {fight}; launch component 120 may initiate execution of an implementation of fight-activity by game logic. In some implementations, neither sequence component 116 nor launch component 120 need to know how a particular user-controllable character would go about the activity of fighting, which may be game-specific, character-specific, user-specific, and/or specific in other ways.

Interface component 124 may be configured to present, to users, user interfaces 125. In some implementations, presentations may be provided to users through user interfaces 125. For example, in some implementations, users may select user-controllable characters through user interfaces 125. In some implementations, users may provide textual descriptions of sequences of activities through user interfaces 125, e.g., through a microphone.

Referring to FIG. 1, user interfaces 125 may be configured to facilitate interaction between users 123 and system 100 and/or between users 123 and client computing platforms 104. For example, user interfaces 125 may provide an interface through which users 123 may provide information to and/or receive information from system 100. In some implementations, user interface 125 may include one or more of a display screen, touchscreen, monitor, a keyboard, buttons, switches, knobs, levers, mouse, microphones, sensors to capture voice commands, sensors to capture body movement, sensors to capture hand and/or finger gestures, and/or other user interface devices configured to receive and/or convey user input. In some implementations, one or more user interfaces 125 may be included in one or more client computing platforms 104. In some implementations, one or more user interfaces 125 may be included in system 100.

Referring to FIG. 1, in some implementations, server(s) 102, client computing platform(s) 104, and/or external resources 136 may be operatively linked via one or more electronic communication links. For example, such electronic communication links may be established, at least in part, via one or more networks 13, including but not limited to the Internet and/or other networks. It will be appreciated that this is not intended to be limiting, and that the scope of this disclosure includes implementations in which server(s) 102, client computing platform(s) 104, and/or external resources 136 may be operatively linked via some other communication media.

A given client computing platform 104 may include one or more processors configured to execute computer program components. The computer program components may be configured to enable an expert or user associated with the given client computing platform 104 to interface with system 100 and/or external resources 136, and/or provide other functionality attributed herein to client computing platform(s) 104. By way of non-limiting example, the given client computing platform 104 may include one or more of a desktop computer, a laptop computer, a handheld computer, a tablet computing platform, a NetBook, a Smartphone, a smart watch, a gaming console, and/or other computing platforms.

External resources 136 may include sources of information outside of system 100, external entities participating with system 100, and/or other resources. For example, in some implementations, external resources 136 may include pretrained text-based system 136a. In some implementations, external resources 136 may include one or more additional neural networks, e.g., to classify multi-dimensional vectors into activities. In some implementations, external resources 136 may provide information regarding user-specific information, character-specific information, and/or other types of information. In some implementations, some or all of the functionality attributed herein to external resources 136 may be provided by resources included in system 100.

Server(s) 102 may include electronic storage 134, one or more processors 132, and/or other components. Server(s) 102 may include communication lines, or ports to enable the exchange of information with a network and/or other computing platforms. Illustration of server(s) 102 in FIG. 1 is not intended to be limiting. Server(s) 102 may include a plurality of hardware, software, and/or firmware components operating together to provide the functionality attributed herein to server(s) 102. For example, server(s) 102 may be implemented by a cloud of computing platforms operating together as server(s) 102.

Electronic storage 134 may comprise non-transitory storage media that electronically stores information. The electronic storage media of electronic storage 134 may include one or both of system storage that is provided integrally (i.e., substantially non-removable) with server(s) 102 and/or removable storage that is removably connectable to server(s) 102 via, for example, a port (e.g., a USB port, a firewire port, etc.) or a drive (e.g., a disk drive, etc.). Electronic storage 134 may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. electronic storage 134 may include one or more virtual storage resources (e.g., cloud storage, a virtual private network, and/or other virtual storage resources). Electronic storage 134 may store software algorithms, information determined by processor(s) 132, information received from server(s) 102, information received from client computing platform(s) 104, and/or other information that enables server(s) 102 to function as described herein.

Processor(s) 132 may be configured to provide information processing capabilities in server(s) 102. As such, processor(s) 132 may include one or more of a digital processor, an analog processor, a digital circuit designed to process information, an analog circuit designed to process information, a state machine, and/or other mechanisms for electronically processing information. Although processor(s) 132 is shown in FIG. 1 as a single entity, this is for illustrative purposes only. In some implementations, processor(s) 132 may include a plurality of processing units. These processing units may be physically located within the same device, or processor(s) 132 may represent processing functionality of a plurality of devices operating in coordination. Processor(s) 132 may be configured to execute components 108, 110, 112, 114, 116, 118, 120, 122, and/or 124, and/or other components. Processor(s) 132 may be configured to execute components 108, 110, 112, 114, 116, 118, 120, 122, and/or 124, and/or other components by software; hardware; firmware; some combination of software, hardware, and/or firmware; and/or other mechanisms for configuring processing capabilities on processor(s) 132. As used herein, the term "component" may refer to any component or set of components that perform the functionality attributed to the component. This may include one or more physical processors during execution of processor readable instructions, the processor readable instructions, circuitry, hardware, storage media, or any other components.

It should be appreciated that although components 108, 110, 112, 114, 116, 118, 120, 122, and/or 124 are illustrated in FIG. 1 as being implemented within a single processing unit, in implementations in which processor(s) 132 includes multiple processing units, one or more of components 108, 110, 112, 114, 116, 118, 120, 122, and/or 124 may be implemented remotely from the other components. The description of the functionality provided by the different components 108, 110, 112, 114, 116, 118, 120, 122, and/or 124 described below is for illustrative purposes, and is not intended to be limiting, as any of components 108, 110, 112, 114, 116, 118, 120, 122, and/or 124 may provide more or less functionality than is described. For example, one or more of components 108, 110, 112, 114, 116, 118, 120, 122, and/or 124 may be eliminated, and some or all of its functionality may be provided by other ones of components 108, 110, 112, 114, 116, 118, 120, 122, and/or 124. As another example, processor(s) 132 may be configured to execute one or more additional components that may perform some or all of the functionality attributed below to one of components 108, 110, 112, 114, 116, 118, 120, 122, and/or 124.

Figure 2:
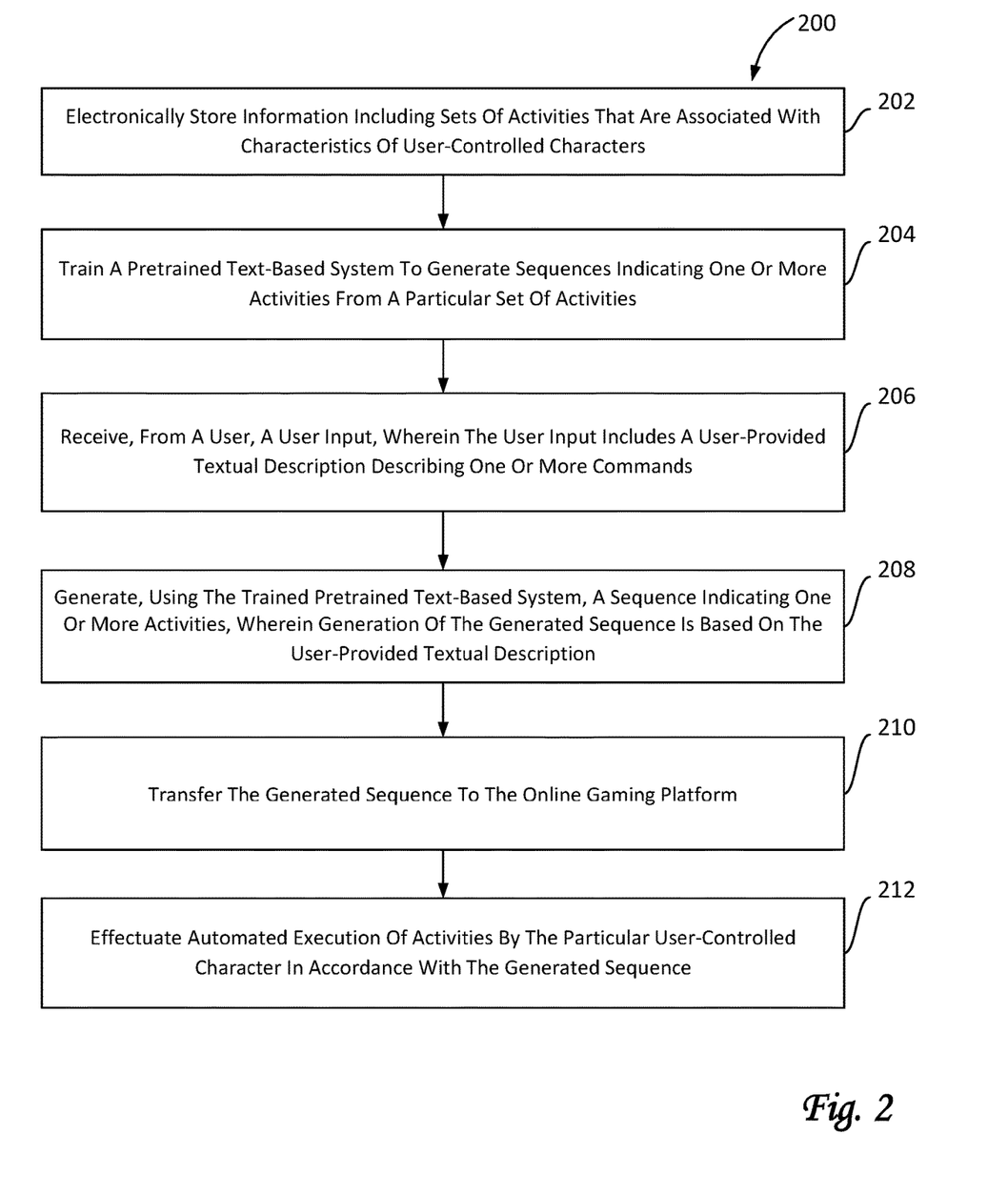
FIG. 2 illustrates a method for using natural language processing (NLP) to control automated gameplay in one or more online games within an online gaming platform, in accordance with one or more implementations.

FIG. 2 illustrates a method 200 for using natural language processing (NLP) to control automated gameplay in one or more online games within an online gaming platform, in accordance with one or more implementations. The operations of method 200 presented below are intended to be illustrative. In some implementations, method 200 may be accomplished with one or more additional operations not described, and/or without one or more of the operations discussed. Additionally, the order in which the operations of method 200 are illustrated in FIG. 2 and described below is not intended to be limiting.

In some implementations, method 200 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of method 200 in response to instructions stored electronically on an electronic storage medium. The one or more processing devices may include one or more devices configured through hardware, firmware, and/or software to be specifically designed for execution of one or more of the operations of method 200.

At an operation 202, information is stored electronically. The information includes sets of activities. Individual ones of the sets are associated with characteristics of user-controllable characters such that a particular user-controllable character having a particular characteristic may perform, within the online gaming platform, one or more activities from a particular set associated with the particular characteristic. In some embodiments, operation 202 is performed by a storage component the same as or similar to storage component 108 (shown in FIG. 1 and described herein).

At an operation 204, a pretrained text-based system is trained, e.g. by using prompts, to generate sequences indicating one or more activities from the particular set of activities. Individual ones of the prompts are based on a combination of a textual description of an individual activity that is included in the particular set of activities and the individual activity. In some embodiments, operation 204 is performed by a training component the same as or similar to training component 112 (shown in FIG. 1 and described herein).

At an operation 206, user input is received from a user. The user input includes a user-provided textual description describing one or more commands. In some embodiments, operation 206 is performed by a user input component the same as or similar to user input component 114 (shown in FIG. 1 and described herein).

At an operation 208, a sequence is generated, using the trained pretrained text-based system, the sequence indicating one or more activities. Generation of the generated sequence is based on the user-provided textual description. In some embodiments, operation 208 is performed by a sequence component the same as or similar to sequence component 116 (shown in FIG. 1 and described herein).

At an operation 210, the generated sequence is transferred to the online gaming platform. In some embodiments, operation 210 is performed by a transfer component the same as or similar to transfer component 118 (shown in FIG. 1 and described herein).

At an operation 212, automated execution of activities is effectuated by the particular user-controllable character in accordance with the generated sequence. In some embodiments, operation 212 is performed by a launch component the same as or similar to launch component 120 (shown in FIG. 1 and described herein).

Although the present technology has been described in detail for the purpose of illustration based on what is currently considered to be the most practical and preferred implementations, it is to be understood that such detail is solely for that purpose and that the technology is not limited to the disclosed implementations, but, on the contrary, is intended to cover modifications and equivalent arrangements that are within the spirit and scope of the appended claims. For example, it is to be understood that the present technology contemplates that, to the extent possible, one or more features of any implementation can be combined with one or more features of any other implementation.

What is claimed is:

1. A system configured to use natural language processing (NLP) to control automated gameplay in an online game within an online gaming platform, the system comprising:
   electronic storage configured to electronically store information, wherein the information includes a set of in-game activities in the online game, wherein at least some of the in-game activities are associated with a particular activity-defining characteristic of a user-controllable character, wherein the particular activity-defining characteristic defines particular in-game activities that are available to be performed during the automated gameplay;
   one or more hardware processors configured by machine-readable instructions to:
      determine, based on the stored information, the particular in-game activities that are associated with the particular activity-defining characteristic, wherein the particular in-game activities are available to be performed during the automated gameplay by the user-controllable character;
      train a pretrained text-based system, using prompts, to generate sequences including one or more identifiers of the particular in-game activities, wherein individual ones of the prompts are based on a combination of:
         (i) a textual description of an individual in-game activity, and
         (ii) an identifier of the individual in-game activity;
      receive, from a user, a user input, wherein the user input represents a user-provided textual description describing multiple commands for the user-controllable character, wherein the user-provided textual description further describes a condition to be evaluated by the user-controllable character during the automated gameplay by the user-controllable character, wherein at least one of the multiple commands is controlled by the condition;
      generate, using the trained pretrained text-based system, a sequence including the condition and at least a first identifier of a first in-game activity and a second identifier of a second in-game activity, wherein generation of the generated sequence is based on the user-provided textual description;
      transfer the generated sequence to the online gaming platform; and
      effectuate automated execution of in-game activities by the user-controllable character in accordance with the generated sequence, wherein the automated execution includes an evaluation of the condition, wherein, subsequent to and depending on the evaluation of the condition by the user-controllable character during the automated gameplay by the user-controllable character, either the first in-game activity or the second in-game activity is automatically executed during the automated gameplay.

2. The system of claim 1, wherein at least part of the online game takes place in a virtual space, and wherein the evaluation of the condition is independent and separate from the first in-game activity and from the second in-game activity.

3. The system of claim 1, wherein the multiple commands include one or more commands directed to a given user-controllable character, wherein the one or more hardware processors are further configured to:
   determine a given activity-defining characteristic for the given user-controllable character, wherein the given activity-defining characteristic is different from the particular activity-defining characteristic;
   determine, based on the stored information, an appropriate characteristic-specific set of in-game activities for the given user-controllable character; and
   generate, using the trained pretrained text-based system, a given sequence of given in-game activities selected from the appropriate characteristic-specific set of in-game activities;
   wherein the given sequence is different from the generated sequence.

4. The system of claim 1, wherein a first individual activity-defining characteristic of a first user-controllable character is associated with a first characteristic-specific set of in-game activities, wherein a second individual activity-defining characteristic of a second user-controllable character is associated with a second characteristic-specific set of in-game activities, and wherein the first characteristic-specific set of in-game activities is different from the second characteristic-specific set of in-game activities.

5. The system of claim 1, wherein the set of in-game activities is specific to an individual online game within the online gaming platform.

6. The system of claim 1, wherein the particular in-game activities correspond to an individual race and/or species of the user-controllable character.

7. The system of claim 1, wherein the one or more hardware processors are further configured to:
select the user-controllable character from multiple user-controllable characters; and
determine the particular activity-defining characteristic for the user-controllable character.

8. The system of claim 3, wherein the user-provided textual description corresponds to a first particular in-game activity responsive to the given user-controllable character having a first activity-defining characteristic, and wherein the user-provided textual description corresponds to a second particular in-game activity responsive to the given user-controllable character having a second activity-defining characteristic that is different from the first activity-defining characteristic, wherein the first particular in-game activity is different from the second particular in-game activity.

9. The system of claim 1, wherein the pretrained text-based system is Generative Pretrained Transformer 3 (GPT-3).

10. The system of claim 1, wherein the user input is received through a user interface.

11. A method to use natural language processing (NLP) to control automated gameplay in one or more online games within an online gaming platform, the method being implemented in a computer system, the method comprising:
electronically storing information, wherein the information includes a set of in-game activities in the online game, wherein at least some of the in-game activities are associated with a particular activity-defining characteristic of a user-controllable character, wherein the particular activity-defining characteristic defines particular in-game activities that are available to be performed during the automated gameplay;
determining, based on the stored information, the particular in-game activities that are associated with the particular activity-defining characteristic, wherein the particular in-game activities are available to be performed during the automated gameplay by the user-controllable character;
training a pretrained text-based system, using prompts, to generate sequences including one or more identifiers of the particular in-game activities, wherein individual ones of the prompts are based on a combination of:
(i) a textual description of an individual in-game activity, and
(ii) an identifier of the individual in-game activity;
receiving, from a user, a user input, wherein the user input represents a user-provided textual description describing multiple commands for the user-controllable character, wherein the user-provided textual description further describes a condition to be evaluated by the user-controllable character during the automated gameplay by the user-controllable character, wherein at least one of the multiple commands is controlled by the condition;
generating, using the trained pretrained text-based system, a sequence including the condition and at least a first identifier of a first in-game activity and a second identifier of a second in-game activity, wherein generation of the generated sequence is based on the user-provided textual description;
transferring the generated sequence to the online gaming platform; and
effectuating automated execution of in-game activities by the user-controllable character in accordance with the generated sequence, wherein the automated execution includes an evaluation of the condition, wherein, subsequent to and depending on the evaluation of the condition by the user-controllable character during the automated gameplay by the user-controllable character, either the first in-game activity or the second in-game activity is automatically executed during the automated gameplay.

12. The method of claim 11, wherein at least part of the online game takes place in a virtual space, and wherein the evaluation of the condition is independent and separate from the first in-game activity and from the second in-game activity.

13. The method of claim 11, wherein the multiple commands include one or more commands directed to a given user-controllable character, the method further comprising:
determining a given activity-defining characteristic for the given user-controllable character, wherein the given activity-defining characteristic is different from the particular activity-defining characteristic;
determining, based on the stored information, an appropriate characteristic-specific set of in-game activities for the given user-controllable character; and
generating, using the trained pretrained text-based system, a given sequence of given in-game activities selected from the appropriate characteristic-specific set of in-game activities;
wherein the given sequence is different from the generated sequence.

14. The method of claim 11, wherein a first individual activity-defining characteristic of a first user-controllable character is associated with a first characteristic-specific set of in-game activities, wherein a second individual activity-defining characteristic of a second user-controllable character is associated with a second characteristic-specific set of in-game activities, and wherein the first characteristic-specific set of in-game activities is different from the second characteristic-specific set of in-game activities.

15. The method of claim 11, wherein the set of in-game activities is specific to an individual online game within the online gaming platform.

16. The method of claim 11, wherein the particular in-game activities correspond to an individual race and/or species of the user-controllable character.

17. The method of claim 11, further comprising:
selecting the user-controllable character from multiple user-controllable characters; and
determining the particular activity-defining characteristic for the user-controllable character.

18. The method of claim 13, wherein the user-provided textual description corresponds to a first particular in-game activity responsive to the given user-controllable character having a first activity-defining characteristic, and wherein the user-provided textual description corresponds to a second particular in-game activity responsive to the given user-controllable character having a second activity-defining characteristic that is different from the first activity-defining characteristic, wherein the first particular in-game activity is different from the second particular in-game activity.

19. The method of claim 11, wherein the pretrained text-based system is Generative Pretrained Transformer 3 (GPT-3).

20. The method of claim 11, wherein the user input is received through a user interface.

* * * * *